United States Patent
Prather et al.

(10) Patent No.: US 8,398,406 B2
(45) Date of Patent: Mar. 19, 2013

(54) SYSTEMS AND METHODS FOR AUDITING AUDITABLE INSTRUMENTS

(75) Inventors: Joel Kim Prather, Linwood, KS (US); David Russell Rasmussen, Leawood, KS (US)

(73) Assignee: Swiss Reinsurance Company Ltd., Zurich (CH)

( * ) Notice: Subject to any disclaimer, the term of this patent is extended or adjusted under 35 U.S.C. 154(b) by 1376 days.

(21) Appl. No.: 10/637,068

(22) Filed: Aug. 7, 2003

(65) Prior Publication Data

US 2005/0033617 A1  Feb. 10, 2005

(51) Int. Cl.
*G09B 19/18* (2006.01)
(52) U.S. Cl. .............................. 434/107; 434/109; 705/4
(58) Field of Classification Search .................. 434/322, 434/323, 107, 109; 705/4, 7, 10, 1.1, 7.28
See application file for complete search history.

(56) References Cited

U.S. PATENT DOCUMENTS

| | | | |
|---|---|---|---|
| 5,737,494 A * | 4/1998 | Guinta et al. ................... 706/47 |
| 5,893,072 A | 4/1999 | Zizzamia | |
| 5,933,818 A | 8/1999 | Kasravi et al. | |
| 6,029,144 A * | 2/2000 | Barrett et al. .................. 705/30 |
| 6,701,313 B1 * | 3/2004 | Smith ............................... 707/6 |
| 6,714,929 B1 * | 3/2004 | Micaelian et al. ................ 707/4 |
| 6,735,572 B2 * | 5/2004 | Landesmann .................... 705/14 |
| 7,113,914 B1 * | 9/2006 | Spielmann et al. ............... 705/7 |
| 7,240,016 B1 * | 7/2007 | Sturgis et al. .................... 705/4 |
| 7,383,233 B1 * | 6/2008 | Singh et al. ..................... 705/80 |
| 7,392,201 B1 * | 6/2008 | Binns et al. ...................... 705/4 |
| 2002/0042763 A1 * | 4/2002 | Pillay et al. .................... 705/35 |
| 2002/0046066 A1 * | 4/2002 | Laurenzano ..................... 705/4 |
| 2002/0099586 A1 * | 7/2002 | Bladen et al. .................... 705/7 |
| 2002/0116229 A1 * | 8/2002 | Steuart et al. .................... 705/4 |
| 2002/0138307 A1 * | 9/2002 | Kramer ............................ 705/4 |
| 2003/0023539 A1 * | 1/2003 | Wilce et al. .................... 705/37 |
| 2003/0023686 A1 | 1/2003 | Beams et al. | |
| 2003/0058277 A1 | 3/2003 | Bowman-Amuah | |
| 2003/0065942 A1 * | 4/2003 | Lineman et al. .............. 713/201 |
| 2003/0071852 A1 * | 4/2003 | Stimac .......................... 345/810 |
| 2003/0078816 A1 * | 4/2003 | Filep ................................ 705/4 |
| 2003/0078846 A1 * | 4/2003 | Burk et al. ...................... 705/22 |
| 2003/0126049 A1 * | 7/2003 | Nagan et al. .................... 705/35 |
| 2003/0154123 A1 * | 8/2003 | Subbloie et al. ................ 705/11 |
| 2003/0158776 A1 * | 8/2003 | Landesmann .................... 705/14 |
| 2003/0167180 A1 * | 9/2003 | Chung et al. ..................... 705/1 |
| 2003/0187719 A1 * | 10/2003 | Brocklebank .................. 705/10 |
| 2003/0195776 A1 * | 10/2003 | Moore et al. ..................... 705/4 |
| 2003/0200125 A1 * | 10/2003 | Erlanger .......................... 705/4 |
| 2003/0208420 A1 * | 11/2003 | Kansal ............................ 705/34 |
| 2003/0229581 A1 * | 12/2003 | Green et al. .................... 705/38 |

(Continued)

*Primary Examiner* — Xuan Thai
*Assistant Examiner* — Bruk Gebremichael
(74) *Attorney, Agent, or Firm* — Oblon, Spivak, McClelland, Maier & Neustadt, L.L.P.

(57) ABSTRACT

Methods and associated systems for automated auditing of agreements. Questions relevant to qualitative and quantitative measures of an agreement relative to selected criteria are retrieved from an audit template along with associated answer options. The questions and answer options are presented to a user and user input received to provide answers to the questions. An audit score is generated to measure a degree of compliance of the agreement with the selected criteria. Scores may be presented for individual questions, or may be aggregated for groups or categories of questions. Scores may be compared to desired threshold values and suggestions to improve the score may be provided. Summary presentations of questions and answers or categories of questions and answers may be presented to monitor compliance over a number of such audits.

30 Claims, 15 Drawing Sheets

U.S. PATENT DOCUMENTS

| | | | |
|---|---|---|---|
| 2004/0015391 A1* | 1/2004 | Dupreez et al. | 705/11 |
| 2004/0054610 A1* | 3/2004 | Amstutz et al. | 705/36 |
| 2004/0088411 A1* | 5/2004 | Jakubowski et al. | 709/225 |
| 2004/0128262 A1* | 7/2004 | Nafousi | 705/400 |
| 2004/0193907 A1* | 9/2004 | Patanella | 713/200 |
| 2005/0015319 A1* | 1/2005 | Guler et al. | 705/35 |
| 2005/0028005 A1* | 2/2005 | Carson et al. | 713/200 |
| 2005/0071185 A1* | 3/2005 | Thompson | 705/1 |

* cited by examiner

FIG. 5

PRINT | BACK

Question Dashboard
Dashboard for Program : CCC 1202
Section : Coverage
From : 12/03/2002
To : 12/05/2002
Type of Audit : Audit 1

| Question | Used | Weight | Yes | No | N/A | Possible | Scored | Score |
|---|---|---|---|---|---|---|---|---|
| | 298 | 300 | 302 | 304 | 306 | 308 | 310 | 312 |
| Are certificated of insurance correct? | 20 | 10 | 20 | 0 | 0 | 200 | 200 | 100% |
| Are correct forms and endorsements being used? | 20 | 10 | 19 | 1 | 0 | 200 | 200 | 95% |
| Are proper coverages being attached to policies? | 20 | 10 | 20 | 0 | 0 | 200 | 200 | 100% |
| Is coverage within scope of program? | 19 | 10 | 19 | 1 | 0 | 190 | 190 | 100% |
| Are additional Insureds addressed correctly? | 3 | 10 | 2 | 1 | 0 | 30 | 20 | 66.67% |
| Are the current edition forms in use? | 20 | 10 | 20 | 0 | 0 | 200 | 200 | 100% |
| Are all forms filed and approved? | 12 | 10 | 12 | 0 | 0 | 120 | 120 | 100% |

292

Comments

Comments for policy number CS21110347-0:
No comments for this policy

Comments for policy number CS21110333-0:
PIP coverage, optional basic coverage waived, Filings indicate $5mm limit 294                                              296

Plan of Action

No Plan of Action

SYSTEMS AND METHODS FOR AUDITING AUDITABLE INSTRUMENTS

BACKGROUND

Modern business practices utilize many forms of contract and agreements to facilitate the exchange of goods and services. Such agreements memorialize the relationship between two (or more) parties. In a number of areas of business, such agreements and contracts form the basis of business. For example, insurance, reinsurance, annuities, and regulated industries (e.g., stocks, bonds, mortgages, finance, taxation) all depend very heavily on such agreements. Various standards, both qualitative and quantitative, are often applied to review an existing contract or a proposed contract to evaluate the value of a contract.

As the "lifeblood" of many business arrangements, it is often useful for a business entity to evaluate qualitative and quantitative aspects of various agreements or proposed contracts. Such an evaluative process may be referred to as an "audit." An audit may be valuable to review existing, executed agreements and contracts as well as proposed agreements. Such agreements that may benefit from audits may be referred to herein as "auditable instruments."

Audits may occur for a variety of purposes. The purpose of an audit is generally to determine if an auditable instrument is in compliance with one or more criteria. Criteria may range from the very simple to the extremely complex. For example, a criterion may be as simple as a mathematical test, comparing a numeric value to a desired threshold. Other criteria may be very complex and require volumes of regulations to properly define.

As presently practiced in the prior art, audits are generally manual procedures prone to human induced error and inconsistency. In general, an auditor of such agreements will determine the specific type of contract to be reviewed. Based on this determination, the auditor will determine from his/her personal expertise what standards are important to the quality of such a contract. The auditor will then review the agreement with those standards (e.g., criteria) in mind to determine the degree of compliance of the agreement with those standards. Different auditors may apply different standards to review of similar agreements. Or, one auditor may apply different standards over time to similar contracts. Important criteria may be mistakenly ignored in audits of agreements. Still further, auditors may vary their perspective of the relative importance of certain criteria with respect to other criteria. One standard or criteria may be adjudged more important in the process by one auditor as compared to another auditor. Or, one auditor may vary the relative importance of criteria over time.

Such human variability can be reduced by supplying standardized scripts of criteria applicable to each type of auditable instrument. Such a standardized script may also aid the human auditor in consistently applying the same relative weight to each criterion. Human auditors may none-the-less fail to adhere to the standardized scripts of audit criteria or may erroneously apply the scripted standard questions and weights.

Computing systems and other automation have been generally applied to automated testing and evaluation systems. However, as presently practiced, such automated testing and evaluation techniques do not provide flexibility in the selection criteria to be adjudged nor in the weighting of various criteria relative to one another. Further, though computing and automated system have been generally applied to such testing and evaluative processes, automation has not heretofore been applied to the audit of auditable instruments in a business relationship context.

SUMMARY

Aspects and features herein solve the above and other problems, thereby advancing the state of the useful arts, by providing systems and methods for automated auditing of auditable instruments. Features and aspects herein provide for generating audit templates to be applied to various identified types of auditable instruments. Such audit templates may include questions to be reviewed, acceptable answer options or ranges of acceptable answers, relative weights of the various questions and answers, etc. Automated audit process features herein may generate an audit score indicating the degree of compliance of the agreement or proposed agreement with respect to the standards or criteria applied.

In one aspect, questions of an audit template may be weighted, dynamically selected, and presented for answering. Individual questions may be selected according to attributes of the agreement. As a result of answers to questions, an audit score may be derived for a given instrument or portion thereof. Audit scores may then be compared to threshold values to provide an indicator of sufficiency of the answers.

One feature hereof provides a method of automated auditing. The method includes selecting a subset of questions from a plurality of questions in accordance with attributes of an agreement, presenting the subset to a user, receiving answers to the subset from said user; and scoring said answers to generate one or more answer scores. In another aspect hereof, the step of selecting further includes receiving selection criteria, and selecting the subset in accordance with the selection criteria. In another aspect hereof the criteria may include agreement type indicia, audit type indicia, policy type indicia, etc. Another aspect hereof further provides that the step of scoring includes deriving an audit score as a function of one or more answer scores. In addition, question and/or answer weights may be associated with questions or answers, respectively. The questions and/or answer weights may then be used in scoring. Scores may be compared to threshold values and the comparison results presented. The results may be presented as a graphical icon such as a traffic signal. Another aspect hereof provides for grouping of questions into categories or sections. Examples of such groups may include: coverage, compliance, pricing, risk selection and underwriting. Scoring of the audit may include calculating an aggregate category score as a function of answer scores.

Another feature hereof provides a method for automated auditing of an agreement. The method first provides an audit template having a plurality of questions and answer options associated with each question. Selection criteria are also provided relating to measurable aspects of the agreement. Relevant questions from the audit template may be retrieved in accordance with selection criteria. The retrieved questions and associated answer options are presented to a user and answers may be received from the user. An audit score may be generated as a function of the received answers wherein the audit score represents a measure of compliance of the agreement with the selection criteria.

BRIEF DESCRIPTION OF THE DRAWINGS

FIG. 5 shows one exemplary audit template question status interface.

FIG. 9 shows one exemplary audit template interface for display of a category score status.

FIG. 11 shows one exemplary audit template question, answer, and score interface.

FIG. 13 shows one exemplary interface for an administrative user to create a new audit template.

DETAILED DESCRIPTION OF THE DRAWINGS

Features and aspects herein are both individually and collectively referred to herein as an audit template. Such a template may include structures, systems and processes that collectively customize and substantially automate an audit of an auditable instrument. The audit template features include creation of standardized questions and possible answer options to permit standardized analysis of compliance of the auditable instrument with respect to issues and measures relevant to the particular agreement. Such questions and answer options may be created by processes operable in systems and may be stored in structures presented further herein below. Other processes may select from among a plurality of possible relevant criteria may be based on attributes of the underlying agreement to be audited.

Figure 1:
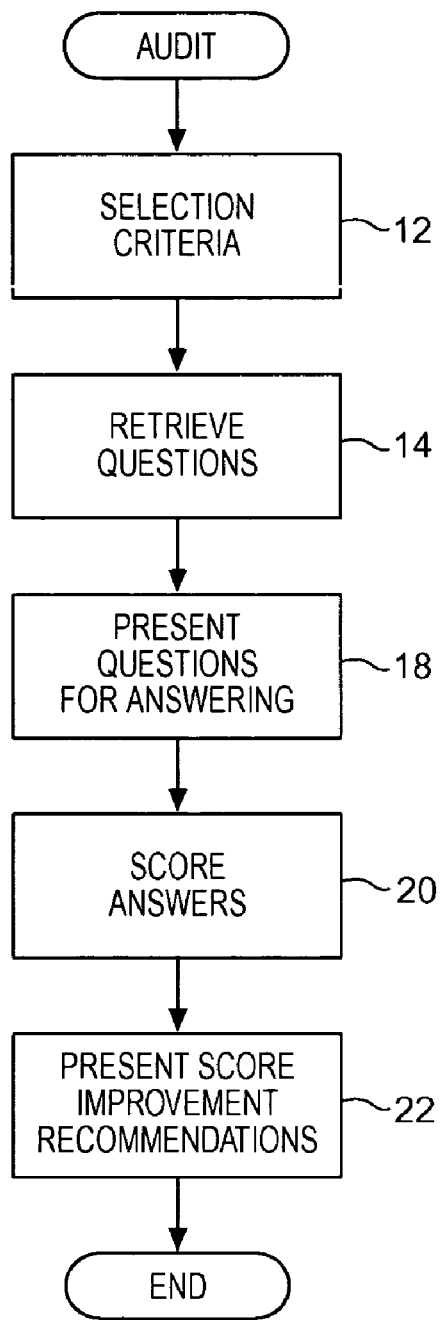
FIG. 1 shows one exemplary process for auditing an agreement using an audit template.

FIG. 1 shows one exemplary process applying an audit template for auditing an auditable instrument. Element 12 is operable to receive selection criteria from user input. The user (auditor) enters initial information identifying, for example, the particular instrument to be audited. Selection criteria may therefore include, for example, the type of agreement, the internal business unit involved in the agreement, the other party to the agreement, etc. The selection criteria so entered may be used, for example, to include relevant questions or to eliminate irrelevant questions. For example where a contract to be audited may be an insurance policy, a selection criteria may indicate the face value of the policy. If the policy face value falls into certain ranges, certain questions may be relevant whereas other questions may not.

The selection criteria may include any attributes of the auditable instrument that may help in determining questions that are relevant to audit qualitative or quantitative aspects of the agreement. The particular selection criteria applicable to a particular implementation of the useful features and aspects herein will be apparent to those of ordinary skill in that industry. Insurance and/or re-insurance contracts may have very different attributes useful as selection criteria than, for example, securities related agreements. Additional details of user input to specify selection criteria is provided herein below.

Element 14 is operable to retrieve question data from a question source based on the received selection criteria. The selection criteria may be applied to identify and retrieve appropriate questions from a question source. Such a question source may be a source or repository of question data. For example, a question source may be a file or database structure such as a simple flat-file, a relational database, an object-oriented database, or other structured data repository. Numerous equivalent structures will be recognized by those skilled in the art as appropriate repositories for questions such that received selection criteria may be applied to locate and retrieve appropriate questions.

Alternatively, a question source may be a question generator process or structure to dynamically generate appropriate questions based on the received selection criteria. Such a dynamic question generator may be, for example, techniques. Such an artificial intelligence system (e.g., expert system, neural network) may interpret the selection criteria and develop questions for return to element 14. More generally, any user input discussed herein could be generated by either a human user or such an electronic source where applicable. As used here, the term "user input" should be understood to include both human user input as well as such electronic sources of input.

The question data received or retrieved by element 14 may include the question text, answer options, question weight, answer weight, instructions, comments, or other characteristics of the question retrieved or reference (e.g., an index) to the actual values. Further examples of question data are provided below.

Element 18 is operable to format and present the questions and associated answer options for display and to receive answer selections. Formatting may include, for example, language translation, device specific formatting (e.g., monochrome hand-held computer, speech generator), location-based formatting (e.g., "dd/mm/yyyy" date, "mm/dd/yyyy" date, 12-hour clock, 24-hour clock, time zone), answer option specific formatting (e.g., checkbox, radio button, numeric value, freeform text), or other formatting to properly display the question data and receive answer choices. Examples of such display presentations are presented and discussed further herein below.

After the presentation of questions and possible answer options, element 18 operates to receive answers as user input. Examples of such user input to answer questions is presented further herein below. Element 20 is operable to score the questions and selected answers. A score for a question/answer represents a qualitative and/or quantitative measure of compliance of the instrument with respect to the criteria represented by the question. Scores may be computed for individual questions and answers, for categories (also referred to as groups or sections) of questions and answers, for total score of questions and/or categories, etc. As noted above, scores may also be weighted such that certain questions may be more heavily factored into a total score (or category/subtotal score) relative to other questions. Exemplary scoring is explained in further detail below.

Optional element 22 is operable to recommend techniques for score improvement. If the score for a question, a category, or a total score indicates a weakness of the audited agreement, element 22 may provide commentary regarding possible approaches to improve the identified low score. Such commentary may identify key questions or answers that may improve the total score or may identify key questions that fail to meet important thresholds. Further detail regarding such score improvement is provided herein below.

Figure 8:
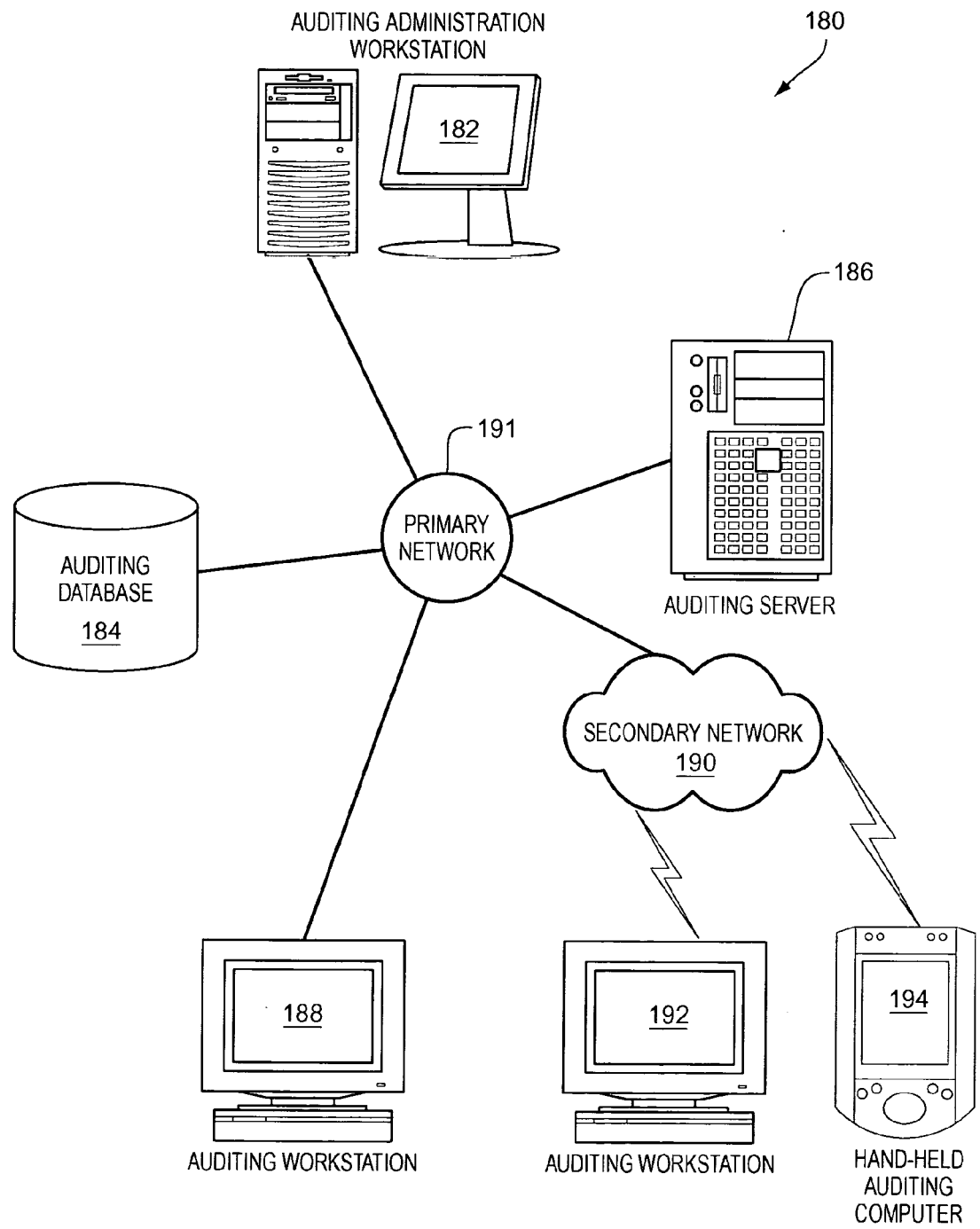
FIG. 8 shows one exemplary system structure suitable for auditing instruments using an audit template.

The process of FIG. 1 may be operable in a computing enterprise such as the exemplary computing enterprise shown in FIG. 8. FIG. 8 shows one exemplary auditing system 180 suitable for auditing instruments using an audit template. Auditing administrator's terminal 182, connected to auditing server 186 via primary network 191, may provide user interaction for administration functionality of the auditing system. Such administration functionality may include user access management and audit template creation and management. Template creation and management may include, for example, question creation including associated answer options, category creation, question/answer/category weight assignments, and/or other supervisory functionality consistent with the setup and maintenance of system 180.

Server 186 may provide centralized processing logic for criteria reception, question selection, answer recording, scoring, and storage management. Data created and managed by processes operable on server 186 may be stored on auditing database 184. Such data may include audit templates comprising a number of questions and related answer options, selection criteria associated with the questions, category information, etc. In addition, data stored on database 184 may include actual answers provided by user input in response to presentation of a particular audit—in other words, audit results. User interaction pertaining to auditing criteria selection, question answering, and score presentation may be performed on client terminals 188, 192, and 194. Terminal 188 may be connected internally to primary network 191 while terminals 192, 194 represent connections via secondary network 190 (e.g., Internet, wireless, dial-up).

The system of FIG. 8 shows a particular distribution of processing, storage and user interface capabilities based on well-known client/server architectures. Those skilled in the art will recognize a wide variety of similar architectures that may be utilized wherein processing and storage features may be localized within a single system or may be distributed over any number of systems and devices. Processes operable on such systems may communicate using well-known interprocess programming techniques and structures. FIG. 8 therefore represents any of numerous equivalent system configurations in which methods and structures for auditing auditable instruments or agreements with audit templates may be performed.

Figure 3:
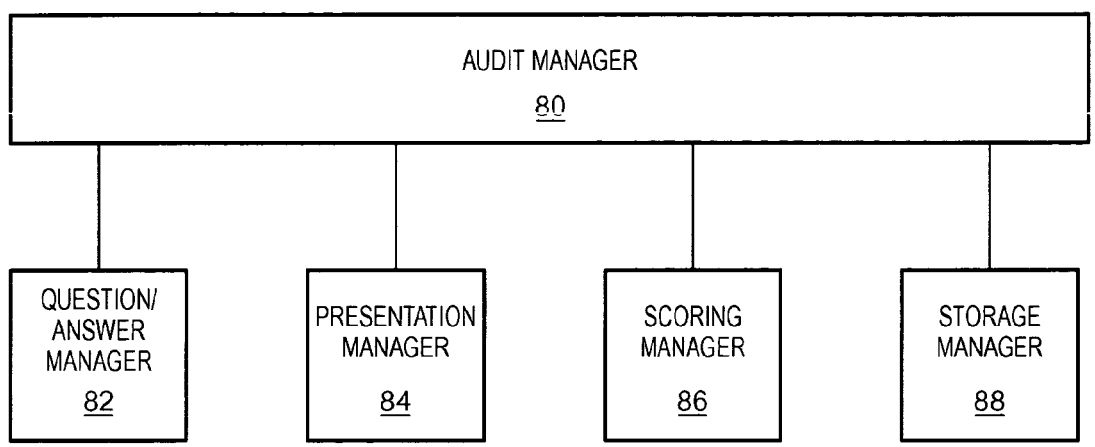
FIG. 3 shows one exemplary functional decomposition for features of an audit manager.

FIG. 3 shows one exemplary functional decomposition for select features operable on a system such as system 180 of FIG. 8. Audit manager 80 may provide processing for management of high-level audit functions such as: question and answer manager 82, presentation manger 84, scoring manager 86, and storage manager 88. Optionally, audit manager 80 may provide administrative functions such as user authorization, access privilege management, performance tuning, audit template creation and maintenance, or other system administrative function.

Question and answer manager 82 may be initiated for the creation, deletion, modification, and organization of questions, answer options, categories and any associated weights for an audit template. Presentation manager 84 may be initiated to format and present questions and answer options to a user and to then receive answer choice selections from a user. Scoring manager 86 may be initiated to score questions, selected answers, and categories based upon answer choices received for presented questions. Storage manager 88 may provide control and access to stored data (e.g., questions, answer options, selected answers, categories, weights, rules, user preferences, display options, security), stored instructions (e.g., scoring rules, question selection criteria), and historical data (e.g., previous scores, previous audits, work-in-progress).

FIG. 3 represents a single exemplary functional decomposition for features operable on an audit system. Numerous equivalent functional decompositions may be recognized by those of ordinary skill in the art.

As noted above, a benefit of features herein arises in the consistency of questions applied to the audit of an agreement and in the scoring of selected answers to those questions. Questions appropriate for a particular agreement or type of instrument may be created by an expert in business aspects of each type of agreement. The audit process may then proceed by selecting appropriate questions previously created by an expert for a particular agreement. Answering the questions then provides a consistent and repeatable process to evaluate relative strengths and weaknesses of an auditable instrument. Creating the audit template therefore may include creation of the text of questions and creation of appropriate answer options corresponding to the question. In addition, if desired, creation of the audit template may include associating weights with the questions and/or answer options to adjust the relative importance of the questions and answers for an audit process. Still further, creation of the audit template may include optional creation of categories and the grouping of questions with associated categories.

Figure 4:
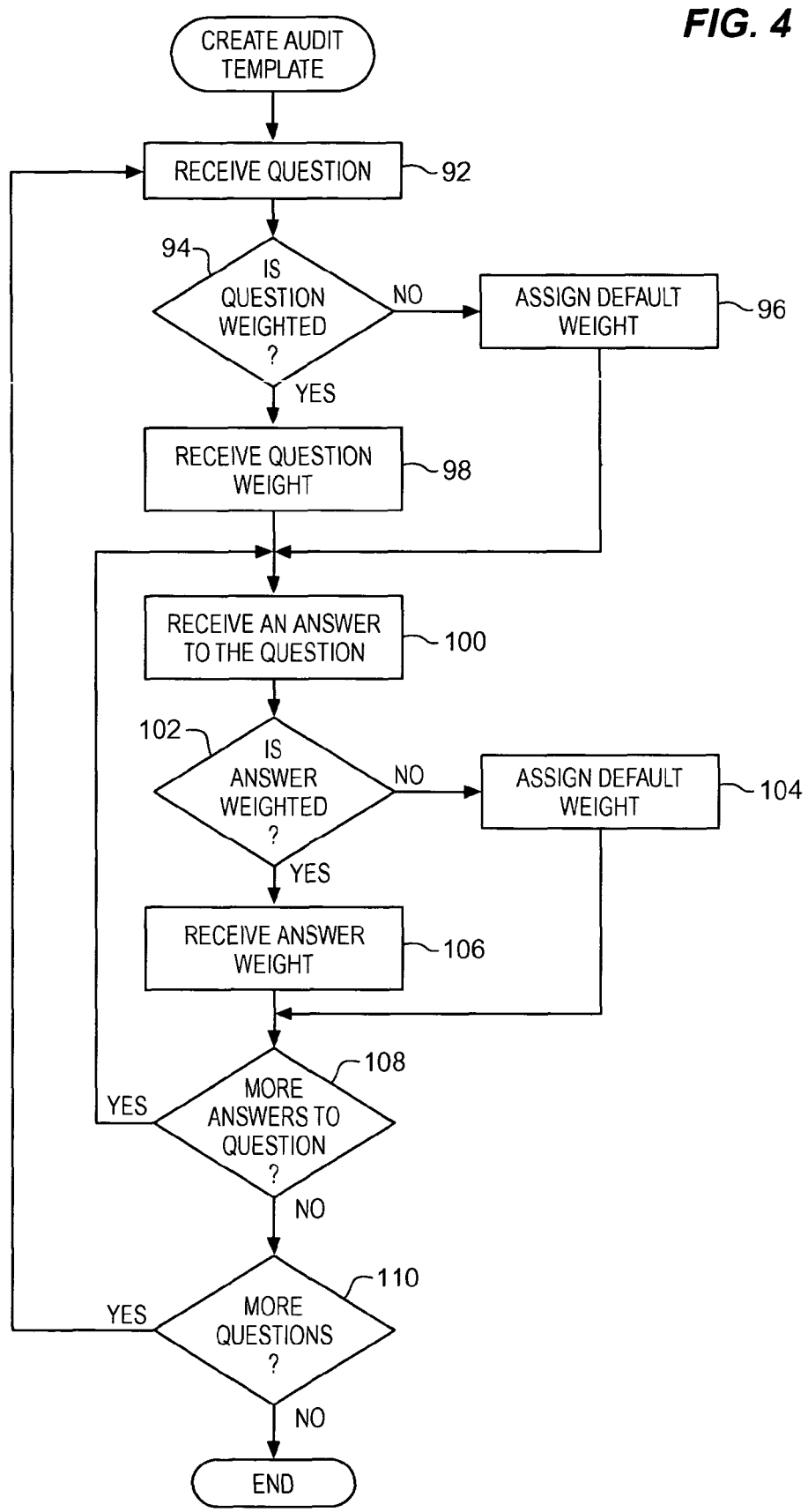
FIG. 4 shows one exemplary process for creating auditing questions suitable for use with an audit template.

FIG. 4 shows one exemplary process for creating auditing questions as part of an audit template. The audit question creation process may be initiated as a process of question and answer manager 82 of FIG. 3. Element 92 is operable to receive a first question from user input. In addition to the basic question text, element 92 may optionally receive category information, comments to be presented to a user along with the question text, instructions to a user to elicit a proper response, or other question indicia.

Element 94 is operable to determine if the question text and other indicia received by element 92 indicates that the question should be weighted. If so, element 98 is operable to receive the desired question weight from user input. If the question is not weighted, a default question weight may be assigned by element 96. Weighting may be optionally implemented to skew a score reflective of the importance of the question. A default question weight may provide for an equal weighting of questions. Details of scoring and the effect of weights on that scoring are provided herein below.

Element 100 is optionally operable to receive a next possible answer option for the current question being defined. In one aspect, each question may have simple yes/no answers in which case operation of elements 100 through 108 may be obviated. However, as noted above, a question may have one or more defined answer options. Elements 100 through 108 are therefore iteratively operable to receive other defined answer options for a question. The answer option input provided by the user may include basic answer option text as well as format information for presentation to a user, comments and instructions associated with the answer option, and other relevant indicia.

Element 102 may then determine if the supplied answer option is to be specially weighted. As discussed herein, each answer options may have a custom weighting factor associated therewith as well as a weighting factor associated with the underlying question. For example, certain questions may have significant weight relative to other questions if one answer option is selected but may have minimal weight if a second answer option is selected. Such questions and associated answer options may represent minimum thresholds that may be present in a particular type of agreement. Further details of these and other scoring features are discussed herein below. If such a special answer option weight is to be provided, element 106 is operable to receive an answer weight from the user. Otherwise, element 104 is operable to assign a default answer weight.

Element 108 is operable to determine if there are more answer options to be associated with the question being created. If so, processing continues with element 100 operating to receive another answer option. If there are no more answer options to be added, processing continues with element 110 to process creation of additional questions. As noted above, in particular embodiments, all questions may be defined as simpler yes/no questions such that answer options for a new question need not be defined.

If element 110 determines that more questions to be defined, processing continues by looping back to element 92 to receive another question. If element 110 determines that there are no more questions, processing to create more questions and answers completes.

Those of ordinary skill in the art will recognize numerous equivalent method steps to receive questions, associated answers option, and optional weights for each questions and/or answer option. As a further option, questions may be weighted to have zero weight or no answer options. A zero-weight value or non-answerable question may be desired for informational or experimental questions that do not impact the auditing score. For example, a question asking whether the customer has expressed an interest in services provided by another business unit might be such a zero-weight question. Yet, the presentation of the question to the auditor may serve as a reminder to attempt "cross-selling" of related products or services.

Figure 12:
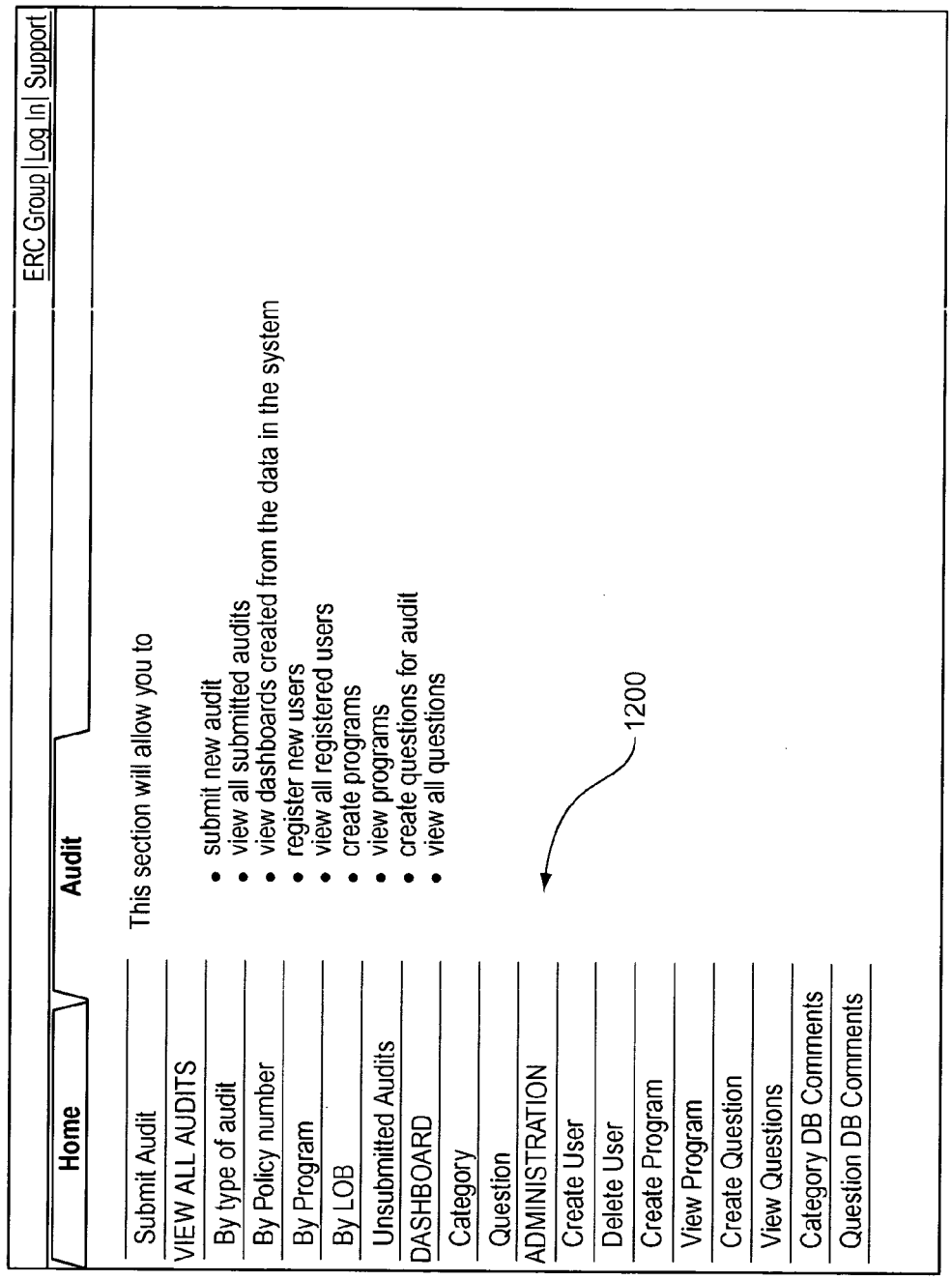
FIG. 12 shows one exemplary interface for an administrative user to create and manage audit templates.

FIG. 12 is an exemplary display screen for use by an audit manager or administrator or other expert user for defining the structure of an audit template. As above, definition of an audit template may include defining questions and associated answer options as well as weights associated with the defined questions and answer options. FIG. 12 is an exemplary display screen for an administrative user to create and manage audit templates. Numerous actions may be selected by links on the display screen listed under "Administration" 1200 on the screen. Such actions may include, for example, addition or deletion of a user (a person to perform audits using the audit templates created by the administrator), addition and viewing/editing of programs for which audit templates have been or may be created, addition and viewing/editing of individual questions and viewing of comments entered by users regarding particular questions or categories of questions. Numerous other actions may be provided as a matter of design choice.

Figure 13:
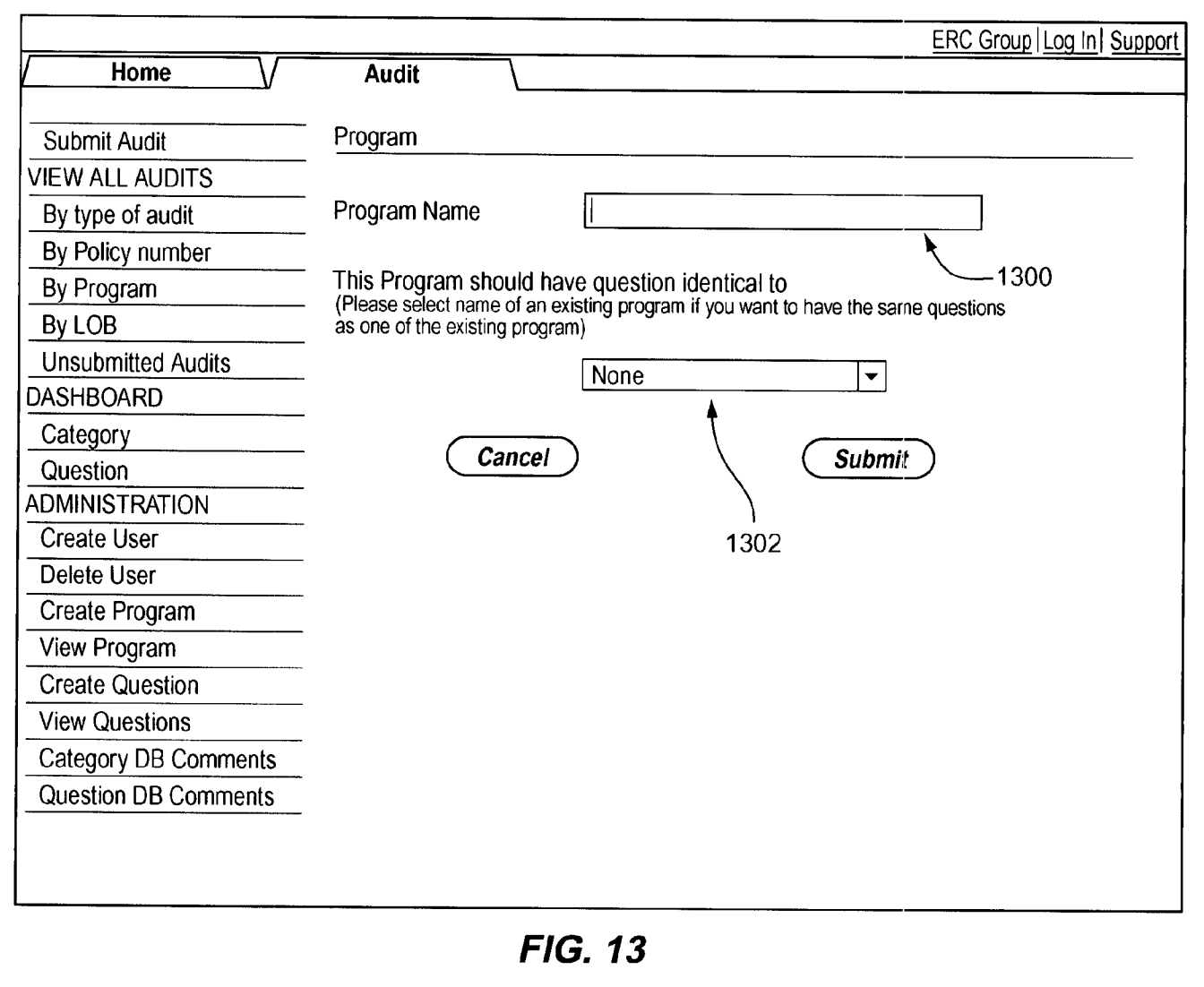

FIG. 13 is an exemplary display screen for an administrative user to create a new program for which audits are to be performed. A new program name may be provided in entry 1300. Further, a similar program template may be referenced as a starting model for questions and answers. The existing program audit template most similar to the desired new program may be selected from the drop-down list 1302. Having so created a new audit template for a new program, the questions associated with the new program (or any existing program) may be viewed.

Figure 14:
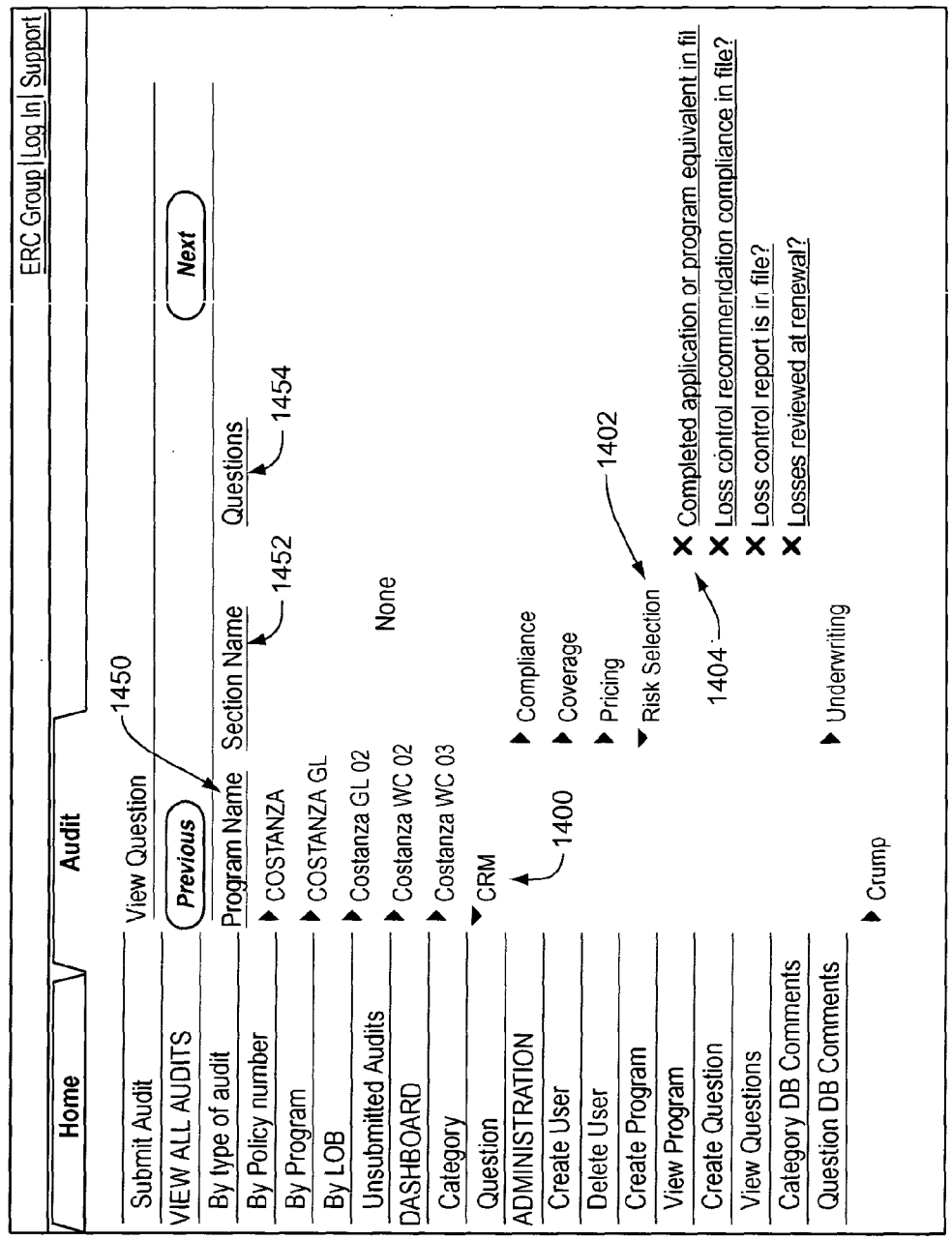
FIG. 14 shows one exemplary interface for an administrative user to view questions of an audit template.

FIG. 14 is an exemplary display screen for an administrative user to view questions of an audit template. Known program audit templates are listed in a first column 1450. A user may then scroll through presently defined program audit templates to locate the template of interest. The desired template 1400 may be selected by the user to reveal a list of question categories (or sections) listed in a second column 1452. A user may then select a question section 1402 to be reviewed to reveal a list of questions in the selected section listed in a third column 1454. The user may then select a particular question 1404 to be reviewed.

Programs, categories/sections and questions may be shown in such a tree-like display or presented in numerous other equivalent formats. Each displayed program, category and question may be presented to the user as a hyper-linked object selected by clicking the associated hyper-link. Other techniques for presenting such information to the user and for receiving user input selections may be employed as a matter of design choice.

Figure 15:
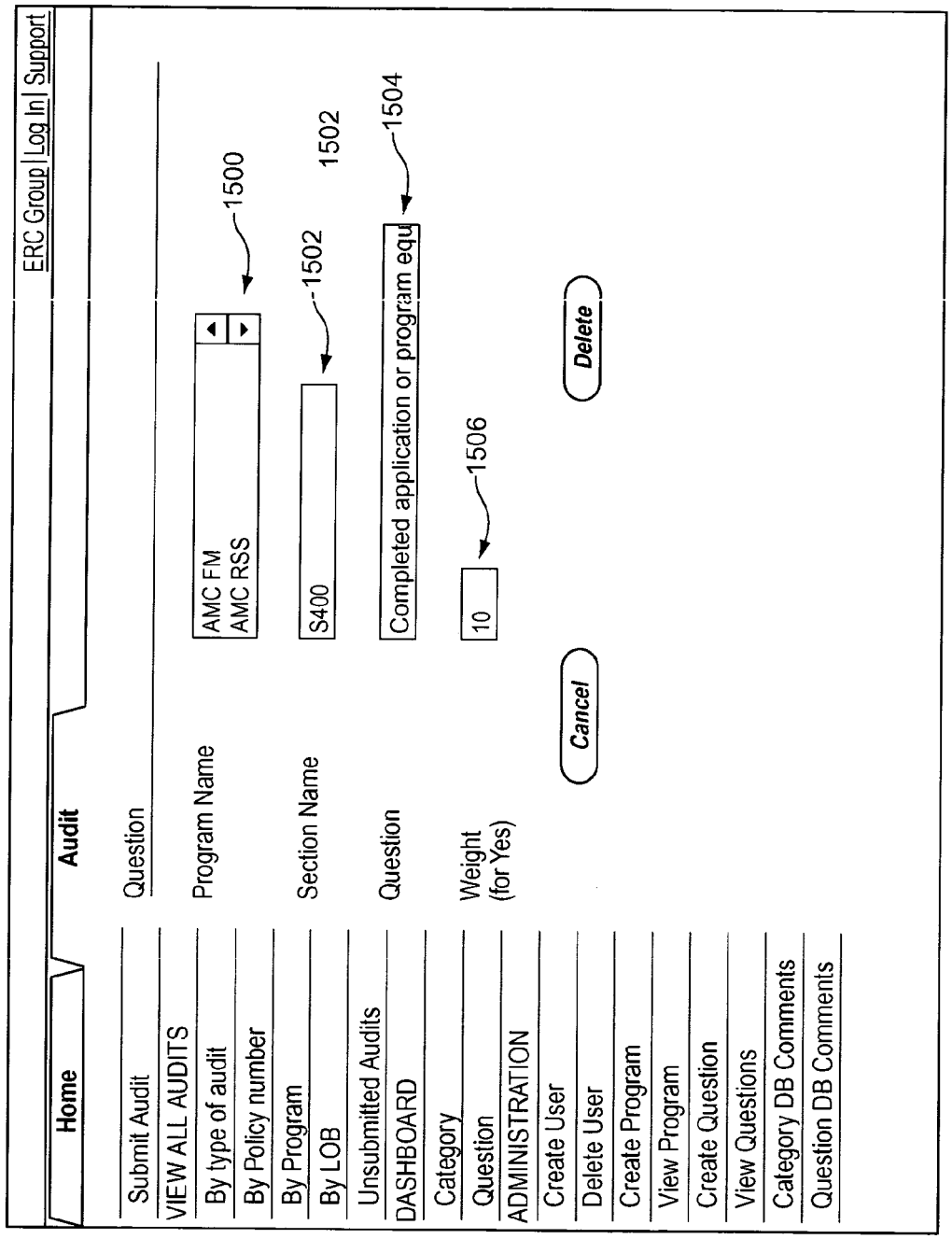
FIG. 15 shows one exemplary interface for an administrative user to add or modify questions in an audit template.

Having selected a question to be reviewed, the selected question and associated information is presented to the user. FIG. 15 is an exemplary display screen for presenting information regarding the selected question to the user. The information may then be edited by the user to modify a selected question and associated information. It may be noted that a similar display may be presented to a user to allow creation of a new question to be added to an existing audit template. A user may select the program or programs with which the question is to be associated by selecting programs from list 1500. The section or category in which the question is to be grouped may be selected from the list of sections 1502. The question text is entered in field 1504 and the question weight (associated with a "yes" answer option) may be entered in field 1506.

The display of FIG. 15 represents a feature wherein all questions are answered as "yes" or "no." In such an application, there is no need to define custom answer options as discussed elsewhere herein. Other aspects discussed herein allow for an administrative user to define answer options for each question. Still other aspects hereof allow the administrative user to assign weight values to each such defined answer option as well as a weight value to the underlying question and category or section of questions. Display screens (not shown) similar to that shown in FIG. 15 may be utilized to elicit such optional definitions for specifically defined answer options and for weights associated with each answer option.

As noted above, questions (and the associated answer options) may be grouped into categories of related questions. Information supplied with the creation of questions as discussed above may identify a category with which to associate the newly created question. Any number of categories may be defined by a user to group related questions for purposes of scoring and associated analysis. Each category may include any number of questions and associated answer options. Further, each category may have an associated weight to be applied for purposes of aggregated scoring as discussed further below.

Figure 2:
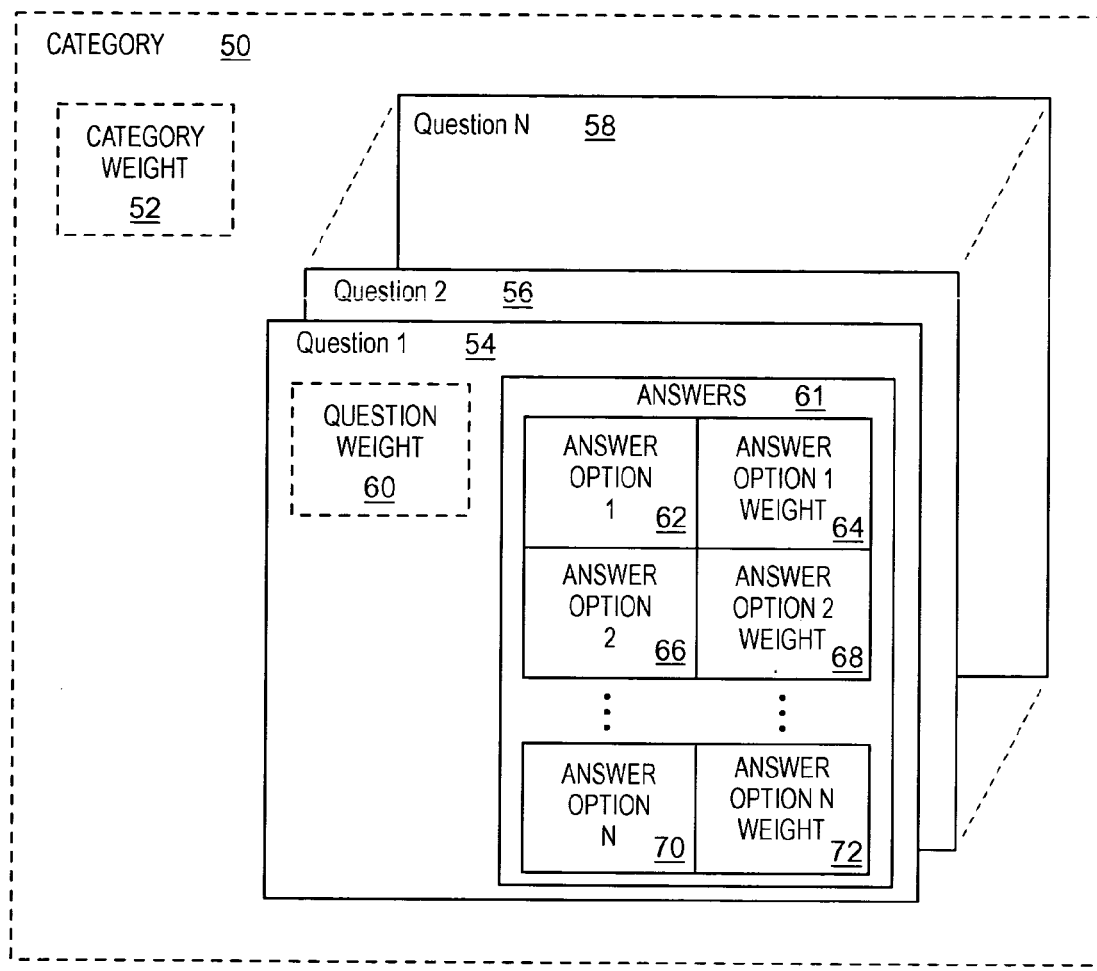
FIG. 2 shows one exemplary organizational structure for an auditing category and associated questions and answers.

FIG. 2 shows one exemplary organizational model for questions 54, answers 61, and optional auditing category 50. Category 50 may include any number of questions 54, 56, 58. Each question (54, 56, 58) may include answer set information 61. The answer set information may include any number of answer options (62, 66 and 70) and associated answer option weights (64, 68 and 72).

Questions, answer options, and categories may each have an optional weight used to characterize a critical element within an audit score. Specifically, category 50 may have category weight 52. Each question 54, 56 and 58 in a category 50 may have an associated question weight (e.g., 60). Scoring and the use of weights is discussed in further detail herein below.

Answer options (62, 66, 70) may be any form of answer appropriate to the corresponding question. Answer options may simply be represented as "yes" or "no." Other answer options may be applicable to particular applications of the automated audit features hereof. For example, another answer option could be specified as "n/a" or "not applicable" to permit a user to exclude the corresponding question from the audit score. Still further examples of such answer options may include:

- a discrete value (e.g., "true," "Ohio," "not signed"),
- a collection or list of discrete values (e.g., coverage riders requested, states a business operates in, company vehicles used for delivery purposes),
- a rule (e.g., a liability amount of at least three times the property value),
- a free-form entry (e.g., description of the property's condition),
- or any other criteria that may appropriately limit a users response to acceptable answer options.

FIG. 2 suggests a hierarchical relationship between categories and associated questions and answer options. Data structures useful to store and retrieve such information will be readily recognized by those of ordinary skill in the art. Other non-hierarchical relationships may also be provided such that, for example, a question and its answer options may be associated with multiple categories. Such organizations and storage techniques to structure the question and answer information for rapid, flexible access will be readily apparent to those of ordinary skill in the art.

Figure 6:
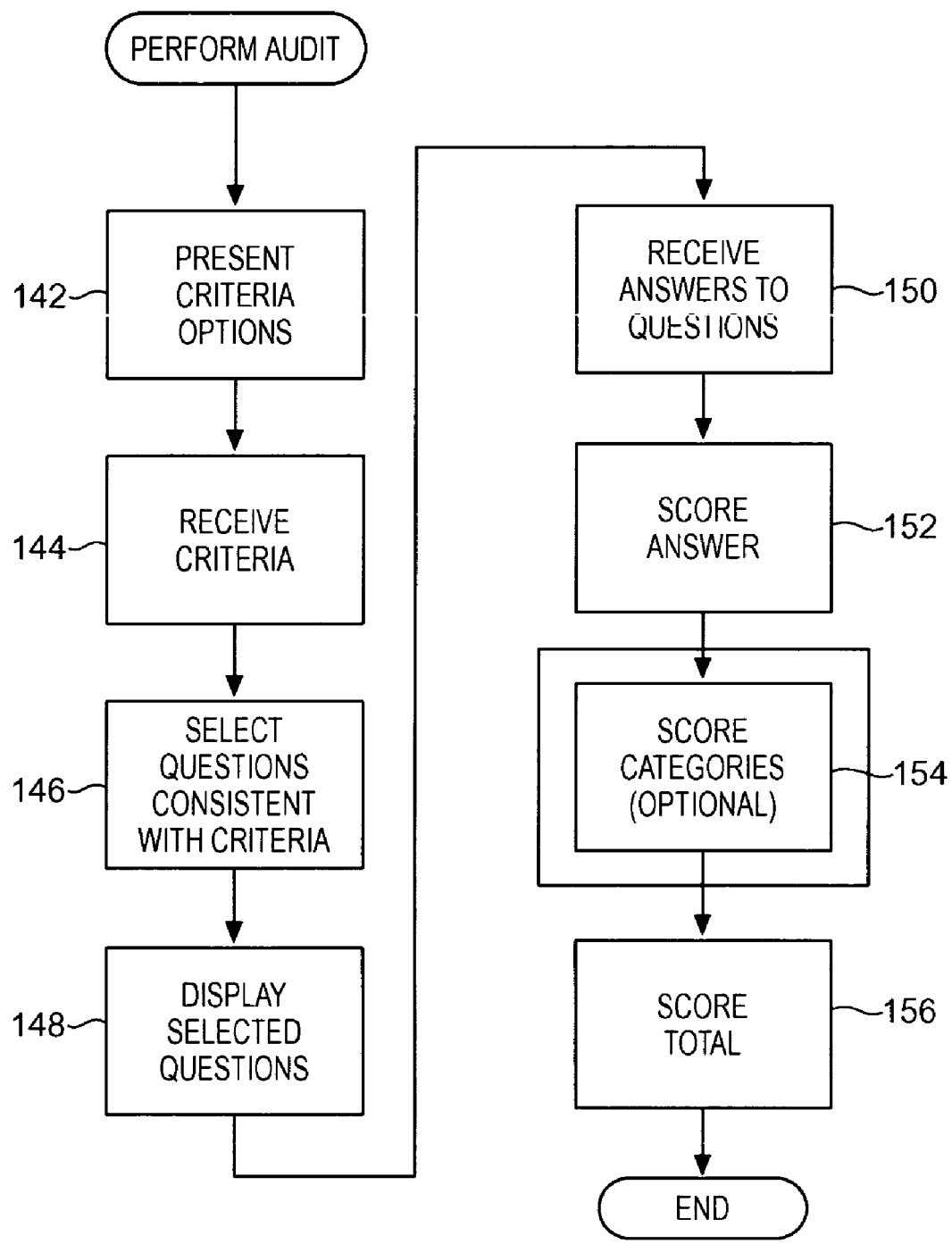
FIG. 6 shows one exemplary process for presenting a subset of audit template questions for answering.
Figure 11:
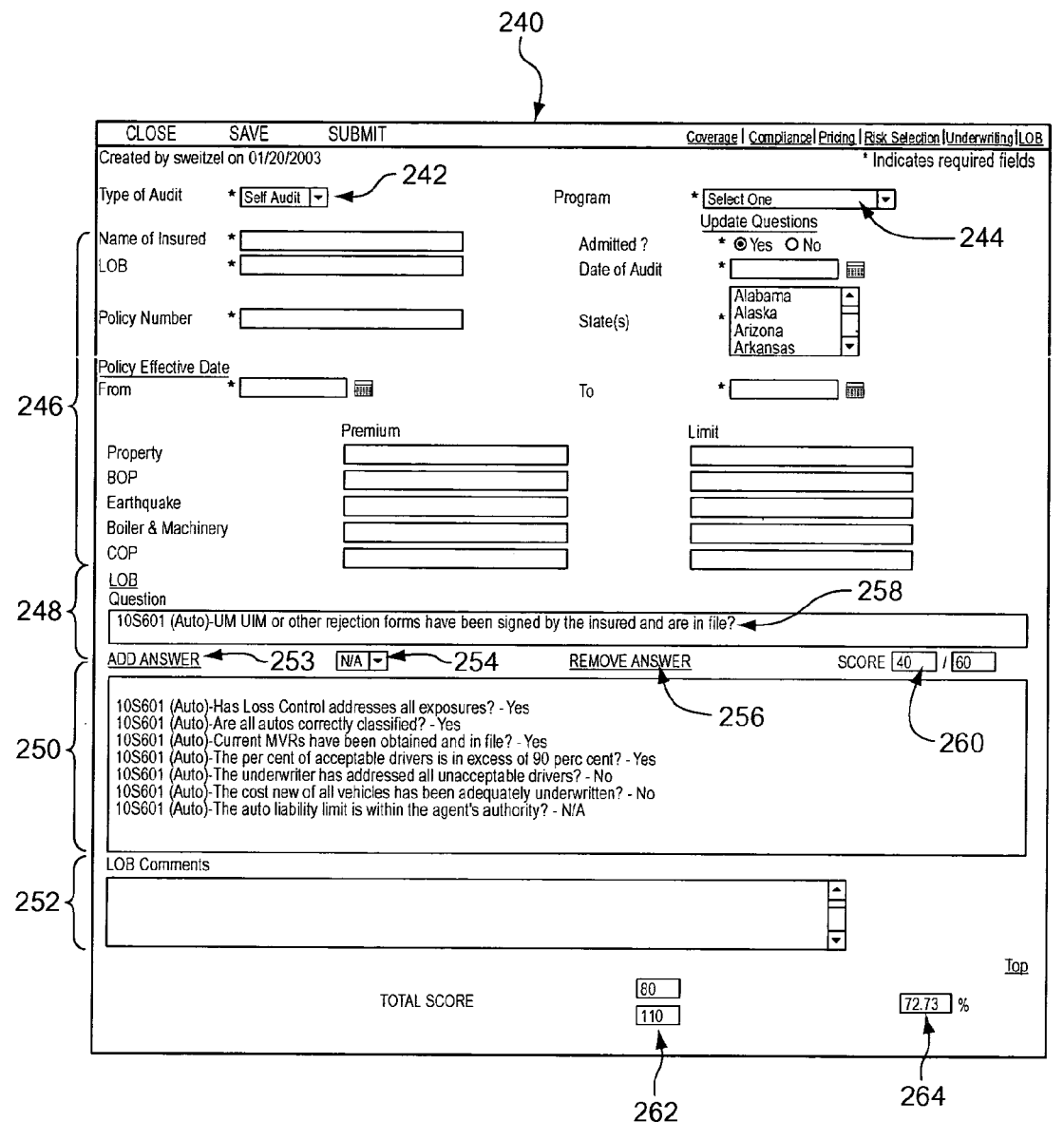

The process of performing an audit generally entails presenting a previously created audit template (e.g., audit questions and answer options) to receive user input and to evaluate qualitative and quantitative aspects of the agreement from such supplied answers. FIG. 11, discussed further below, presents an exemplary user interface display useful in performing an audit. FIG. 6 shows one exemplary process for performing an audit including generating a resultant score representing the outcome of the audit. The process to perform an audit may be initiated by presentation manager 84 (of FIG. 3), scoring manager 86 (of FIG. 3), or a combination thereof.

Element 142 of FIG. 6 is operable to present question selection criteria options to a user. The selection criteria options presented by element 142 may be any user selectable criteria related to the audit such as: purpose of the audit, agreement type, date range, policy limits, or other relevant criteria to identify the audit type and subject of the audit. Element 142 may present criteria options to a user for user input to select the desired criteria. After the criteria are received as user input by element 144, processing continues with element 146 operable to select questions related to the criteria. Numerous questions may be standardized and selected for all audits and/or for all types of agreements. For example, a user's name, type of audit, time of the audit, routing information, etc., may all be standard questions included in every audit regardless of the type of audit or type of agreement being audited.

Element 148 is operable to present the selected questions on a user's display. Element 150 is then operable to receive answers to presented auditing questions. Element 150 may receive any appropriate answer choice for each question presented. Additionally, element 150 may restrict answer choices to only properly formatted answer choices. By providing standardized answer options for each question, element 150 may enforce entry of only standard answers by user input. For example, the question, "Is the agreement signed?" may cause element 150 to reject answers choices that are not indicative of "yes" or "no". Questions may also accept "non-answer" responses to indicate that a given question is either not applicable or no answer is determinable. For example, the question, "Any judgments against client in the last 5 years (yes/no)?" may have been left unanswered and justify a user selecting a "non-answer" answer choice such as leaving the answer blank or selecting an answer choice of "N/A." Other acceptable answer options may include selecting a single item from a list of items, entry of a single free form item, selecting multiple items from a list, entry of multiple free form items, numeric values, text value, and/or dynamic rules. An example of a dynamic rule may be "Enter a liability coverage at least 3 times the property value?" where the acceptability of an answer is a monetary amount defined by a relationship with an answer to a previous question.

Well known programming techniques associated with user interfaces may allow for numerous options in restricting or validating answers for proper form and content. Those of ordinary skill in the art will recognize such programming techniques and their application to receipt of answers to selected questions.

Element 152 is operable to score auditing questions. Scoring may occur in real-time (or near real-time) as questions are answered. Alternatively, scoring of audit questions may be performed as a batch process after all questions are answered, after categories of related questions are answered, or after groups of related questions are answered. Optionally, questions may be categorized in which case element 154 is operable to determine a score for each category of questions. Element 156 is operable to calculate a total score as a representation of one or more questions within one or more categories. Details of scoring for audit processes are discussed further herein below. Those of ordinary skill in the art will recognize numerous equivalent method steps to present selected questions, receive answers, and score the results of the audit based on the supplied answers.

As noted above, an audit process may include generation of a score indicating the degree of compliance with related criteria. Each answer to each selected question may generate a score for that question. Scores for a number of questions may be aggregated by computations to generate a total score or a score for a group or category of questions. The score for each question may be compared to an associated threshold value to determine compliance of the auditable instrument relative to the issue raised by the question. Further, aggregated scores for groups or categories of questions or a total score for all questions may be compared to associated threshold values to indicate the degree of compliance of the instrument relative to those aggregated questions.

Further, as noted above, each question, answer option or category of questions may be created with an associated weighting factor to skew the score for that question. The weight of each question, answer option or category indicates the relative importance of that question, answer option or category relative to others in determining a score for the audit.

For example, a category of questions, such as "Application Completeness," may reflect an underwriter's thoroughness. A low score in such a category may reflect additional work required for a senior underwriter but not necessarily indicate a serious defect of the auditable instrument itself. Therefore, such a category may be weighted much lower than another category, such as "Regulatory Compliance," in which a low score may indicate a serious defect in the auditable agreement. Similar weighting logic applies to questions. For example, the question "Is the ZIP-code in 'ZIP+4' format?," may be of trivial value and weighted accordingly. Individual answer options may also have different weights to reflect their value. For example, "is the agreement signed?" may have a trivial "yes" answer option weight, reflecting the normal and expected value. However, a "no" answer option may be heavily weighted to reflect the major defect represented. Implementation of weighting for questions, categories of questions, or individual answer options may be at the option of the designer. If no special weighting is desired, all questions, categories and answers may be presumed to be equally weighted.

Figure 7:
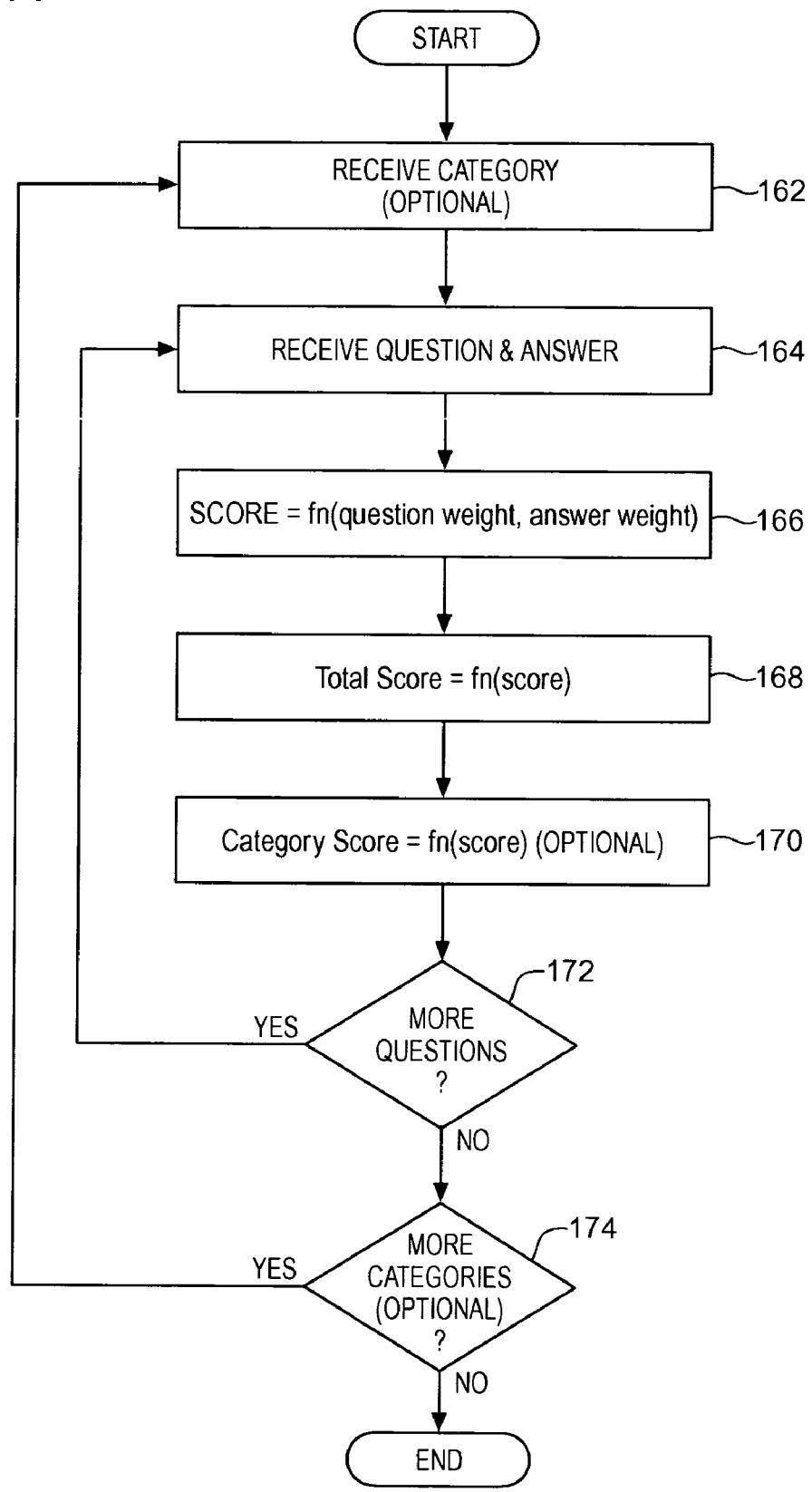
FIG. 7 shows one exemplary process for producing an audit score.

FIG. 7 shows one exemplary process for producing an audit score with optional weighting of questions, answer options and categories. Such scoring is noted above as elements 152, 154 and 156 of FIG. 6. The process of FIG. 7 may be initiated as a "batch" process by, for example, scoring manager 86 (of FIG. 3). However, as noted, the process of scoring an audit may be performed in real time or near real time as questions are answered. Thus, the process of scoring of FIG. 7 may be performed in parallel with or integrated with the process of presenting questions and receiving answers. In other words, the process of scoring may be integrated with the audit process as part of the presentation of questions and the receipt of answers.

Element 162 is optionally operable to retrieve a category of selected questions in the audit process if categories have been defined by the selected audit. If there are no categories defined by the particular audit, all questions may be scored as though in a single category. Element 164 is operable to retrieve an audit question and associated answer. As noted above, questions, answer options and category information may be stored in a structured data repository such as an audit database. In addition, answers received from user input may be stored in such a repository for use in later (i.e., "batch") scoring. Where the scoring process is performed in real time as an integrated aspect of the audit process, element 164 retrieves the selected answer option for each question from the provided user input.

Element 166 is operable to produce an audit score from a function utilizing the supplied answer option, the question weight and the answer option weight. For example, a "yes/no" question may have a question weight of 5, the "Yes" answer option may have an answer option weight of 10, the "No" answer option may be weighted as −10, and the not applicable ("N/A") answer option may be weighted as 0. An exemplary scoring function may then be defined as, "question weight X answer option weight=score." Therefore, in this example, a "Yes" answer would result in a score for this question of 50 points. A "No" answer would result in a score for this question of −50 points, and an "N/A" answer would generate a 0 score for this question. Those of ordinary skill in the art will recognize that any function capable of determining a score for a selected answer to a question may be used as a matter of design choice. Further, the function used to determine a score for a question may be provided by user input when the question is defined in creation of the audit template as discussed above.

Element 168 is operable to produce a total score as a function of the scores previously calculated by element 166. For example, element 168 may sum the scores calculated for each question as determined by element 166 or may average the scores, or any other desired function as a matter of design choice. Element 170 is similarly operable to calculate an optional category score utilizing a suitable function to score a category from constituent question scores.

Element 172 is operable to determine if more questions remain to be scored. If so, processing continues by looping back to element 164 retrieving another question. If element 172 determines there are no more questions to process, processing continues with element 174 operable to determine if more categories require processing. If element 174 determines there are more categories, processing continues with element 162 retrieving another category. If element 174 determines there are no more categories, the process terminates.

Figure 10:
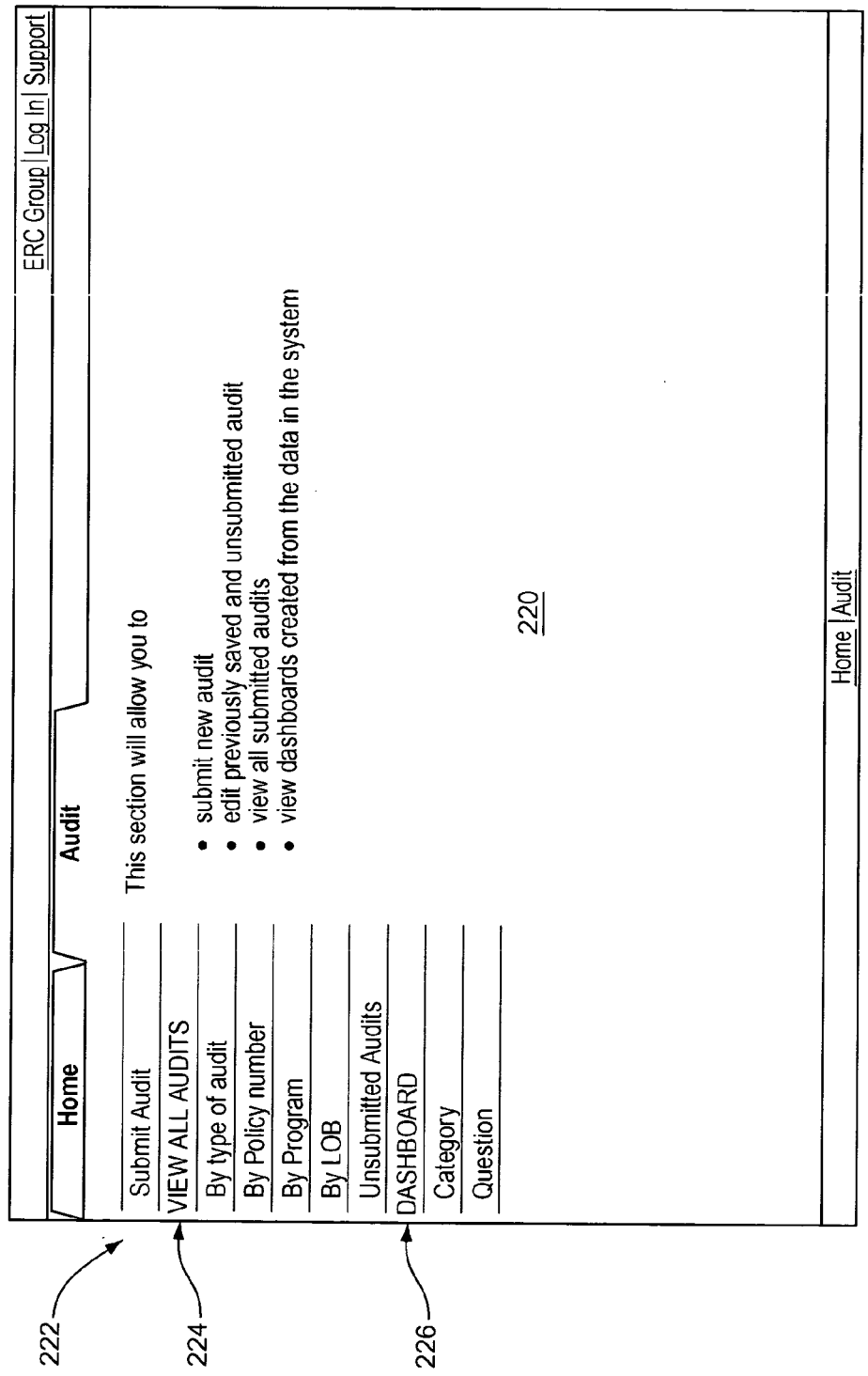
FIG. 10 shows one exemplary user interface for audit template management.

Numerous screen displays and other presentations of the audit process will be readily apparent to those of ordinary skill in the art. FIG. 10 shows one exemplary interface 220 useful as an initial user interface display to provide audit management functions. Interface 220 presents a user with high-level auditing functionality for the user's selection. Such functionality may include creating a new audit 222, reviewing an audit 224, or viewing the status of a category or question 226. A user may provide keyboard input, click a pointing device, or provide other input to select an action to be performed through interface 220. As shown, viewing options 224 allow a user to review audit information based on, for example, the audit type, the policy number (or other agreement identifier), the particular program or line of business. Further, dashboard options 226 allow a user to review the status of questions or categories. Questions and categories may be reviewed in a "dashboard" style presentation summarized by the questions or by the category of questions.

Numerous formats may be utilized to present auditing functionality to a user for their selection. Additionally, an administrative functionality (not shown) may be available on interface 220 to qualified users for the creation of audit template questions, answer options, and other administrative functions.

FIG. 11 shows one exemplary interface 240 for presenting a selected audit template to a user. Interface 240 may be presented, for example, by selection of a new audit 222 of FIG. 10. Interface 240 of FIG. 11 may provide first selection criteria 242, second selection criteria 244, and third selection criteria 246. Selection criteria 242, 244, 246 each provide means to select the audit template questions relevant to the instrument to be audited. First selection criteria 242 may select a type of audit to be performed. For example, an "insurance" audit type may limit the template to questions with relevance to the insurance industry. Such questions may include questions to determine if the proper underwriting, pricing, and issuance aspects of the instrument being audited are in compliance. Second selection criteria 244 provide additional criteria for the selection of a business program, or area, as a further refinement of the selection criteria initiated with element 242. For example, if "insurance" is selected as an input to first selection criteria 242, then the business area selection options provided by second selection criteria 244 may include life, health, personal property, business casualty, key-man, board of directors' liability, or other such refinement of first selection criteria 242. First and second selection criteria 242 and 244 provide for the selection of questions appropriate to a particular type of agreement and a particular area of business. Third selection criteria 246 provides a plurality of optional selection criteria to further limit the scope of the audit. For example, in the context of auditing an insurance agreement, such limitations may include name of insured, line of business, date of audit, state of insured, policy date, or specific agreement attribute. As a result of inputs to elements 242, 244 and 246, auditing questions presented may be as broad or narrow as necessary for the audit template to provide the desired utility.

Selection criteria elements 242, 244 and 246 may be completed with information retrieved from related data processing systems. For example, the selection criteria of element 246 may be automatically supplied by an insurance policy issuance system. The insurance policy system may automatically retrieve insurance policy information in response to other entered selection criteria in elements 242 and 244.

Selected questions to be answered may be presented to the user in unanswered question display 248, here showing unanswered question 258. The user may select a question from unanswered question display 248. As shown in FIG. 11, the user may select a corresponding answer from answer options 254, and click "add answer" 253. By adding the answer, the corresponding question may be removed from the unanswered question display 258 and placed in answered question display 250. Additionally, comments relating to the selected answer option 254 may be entered or received from comment block 252. Available answer options 254 are defined by the audit template as an administrative function in creating the audit template as discussed above.

Scoring, such as that explained above, may generate a score reflective of the selected answers. Scores may then be displayed for a category of questions 260 or for a total audit score 262. Each displayed score (260 and 262) may include indicia of maximum possible score as threshold that may be achieved in the audit of an agreement. Further, the total score may be indicated as a percentage 264 of the total possible score.

Answers to questions may be revised by selecting the desired answered question from answered question display 250 and clicking remove answer 256. The selected question, now unanswered, may then cause a new category score 260, total score 262, and/or percentage indicator 264 to be re-calculated. Additionally, the question may be removed from answered question display 250 and re-inserted into unanswered question display 248 where it is available for answering again.

Numerous equivalent displays may be used to present selection criteria and the associated questions and answer options. For example, certain selection criteria may be automatically determined based on user identification information (e.g., user login, user terminal identification). Such information may identify the job or role of the user and thus supply associated selection criteria. Another option would be to allow an expert system, "super user," or administrator to determine the selection criteria for a user. Such criteria may be statically or dynamically associated with a user. For example, a novice auditor may be presented with insurance audits for a policy amount of no more than $1 million regardless of the policy value selected by the novice user.

Figure 9:
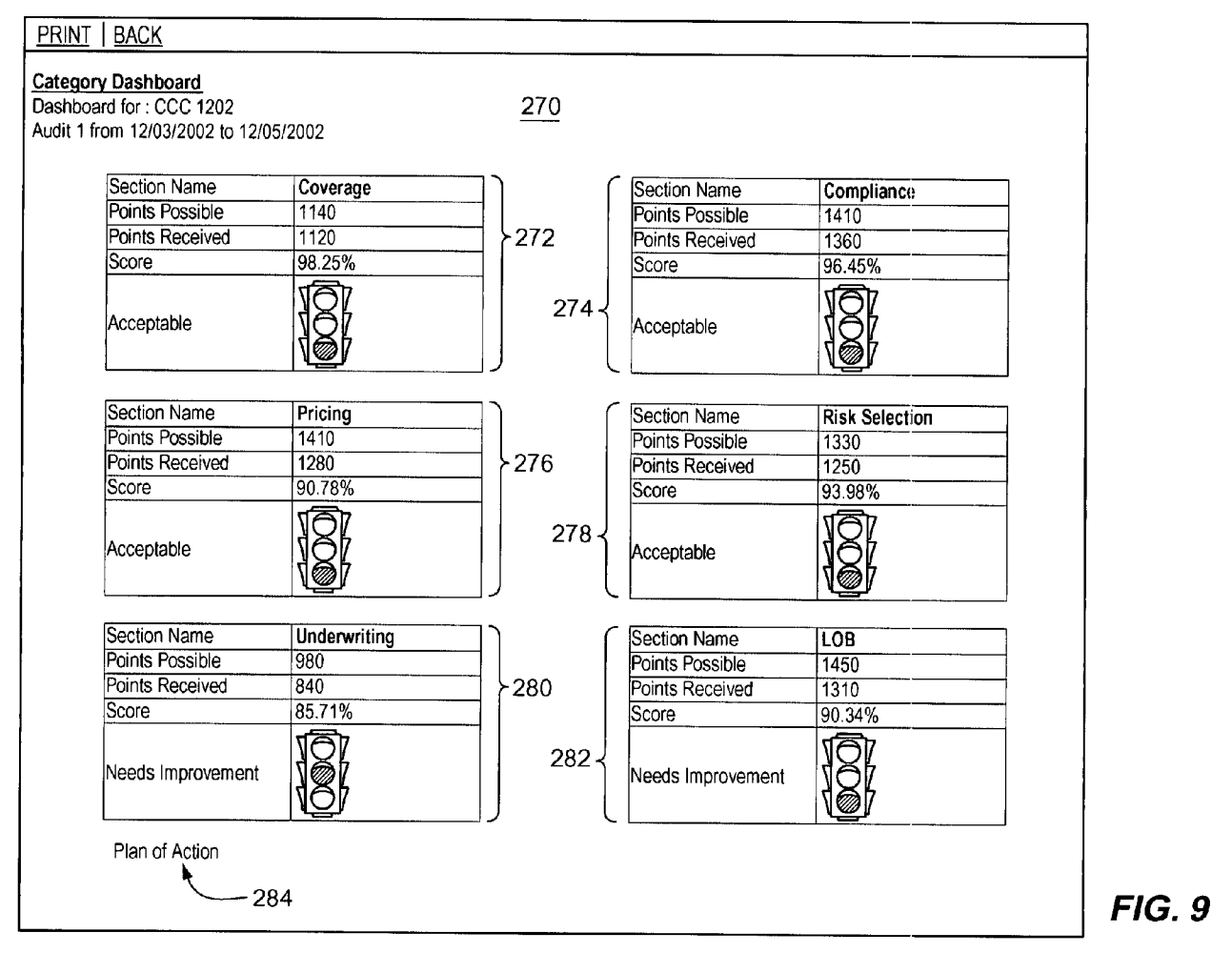

FIG. 9 shows one exemplary audit template category score status display 270. Status display 270 may be presented by selecting category dashboard 226 of FIG. 10. Status display 270 of FIG. 9 presents a plurality of auditing category statuses 272, 274, 276, 278, 280, 282 with various indicia to aid a user in determining if an auditing category has reached a desired threshold. Optionally, the status may be calculated for individual questions, groups of questions (e.g., categories), or all questions. The status may include a numeric score value, number of questions answered, a ratio or other percentage of questions receiving a defined answer. A category of questions may be summarized in the status display for a plurality of audited agreement to allow a user to view trends or particular problem areas common to a number of audited agreements. For example, category status 272 indicates scores for a category of questions relating to "coverage" for a plurality of audited agreements audited between "Dec. 3, 2002 to Dec. 5, 2002." This status indicates that the scores for this category achieved 98.25% of maximum possible points and hence have achieved an "acceptable" threshold. By contrast, answers for questions in the "underwriting" category indicate only 85.71% of the possible total score. Such a result is deemed to "need improvement."

In addition, the status of each category may be indicated by an iconic representation of a total score of a category. For example, as shown in FIG. 9, each category status 272, 274, 276, 278, 280 and 282 may include a traffic light graphic icon indicating the status of questions answered in that category. The color of the light of such a graphic icon provides a simple, easy-to-interpret indication that the corresponding category is acceptable (green), in need of improvement (yellow), or unacceptable (red).

The threshold value at which a score triggers an indicator of its acceptability may be determined according to any appropriate business goal or standard. For example, status 280 may justify an "acceptable" condition indicator when the percentage of "yes" scores is a least 90% of all answers received. A "needs improvement" condition indicator may be generated for "yes" values received at a ratio of 80% up to 90%. A "failure" condition may be defined as a frequency of "yes" values less than 80% of all received answers. The specific threshold values used to indicate the status of each category score may be defined by an administrative function as noted above in the creation of an audit template.

Still further, a score improvement recommendation ("plan of action" 284) may be provided to guide the improvement of one or more scores. The "plan of action" provides the user with guidelines or specific details as to how lower scores in the audit may be improved. Such plans may be entered by administrative users such as managers or senior auditors and may then be provided to appropriate contracting entities to improve their structuring of agreements in the future. The administrative user may enter such plan commentary in administrative display screens (not shown) intended for review of trends over broad categories of questions.

Numerous equivalent displays may be used to present category status to a user such as: presenting indicators for only scores requiring a users attention, hierarchical arrangement of scores (e.g., Pareto diagram), or other visual, auditory, or tactile indicator of a score requiring notification to a user.

FIG. 5 shows one exemplary question status dashboard interface, 290. Such an interface may be presented in response to a user clicking the question dashboard option 226 of FIG. 10. Question status display 290 of FIG. 5 provides a status of questions 292 asked in a plurality of auditing sessions for a plurality of auditable instruments. The statuses 298, 300, 302, 304, 306, 308, 310, 312 for the plurality of questions provide the user with a visual cue of the questions relevance and answers received for the questions.

Status 298 indicates the number of times a question was presented. As discussed above, questions may be selected for particular audits of particular agreement based on selection criteria. The number of times a question is selected and presented for answering may be of interest to a user. Status 300 provides the user with a weight which may be beneficial to informing a user of the value of the question under review. Such a review of a question weight may be useful to analyze a score producing unexpected results. Status 302, 304, 306 provide the frequency of answer choices selected, such as, "Yes," "No," or, "N/A" respectively. Status 308 provides a maximum score possible as determined from a question's weight and frequency of use. The actual score received for a question is shown as status 310. Additionally, a percentage indicator, as discussed above, may be provided to alert a user to questions requiring attention. Also, as a further aid to a user in identifying questions requiring additional attention, status 312 may provide a color indicator, such as green for pass, yellow for caution, and red for failure.

The use of status interface 290 may provide an auditor, supervising auditor, or other party with interest in a summary view of audits performed with a simplified "dashboard" display of audit results. Results out of expected bounds may be more readily apparent to a user who may then initiate further investigation or improvement activities.

Optionally, comments 294 may provide guidance and reference as to why a user entered an answer, problems encountered, or other user's statement that may assist in further auditing activities or historical preservation of notable aspects of audits performed. As a further option, score improvements recommendations may be presented to a user to suggest a plan of action 296 which may improve audit scores. The "plan of action" 296 provides the user with guidelines or specific details as to how lower scores in the audit may be improved. Such plans may be entered by administrative users such as managers or senior auditors and may then be provided to appropriate contracting entities to improve their structuring of agreements in the future. The administrative user may enter such plan commentary in administrative display screens (not shown) intended for review of trends over numerous answers to particular questions.

Numerous equivalent displays may be used to present audit questions or to present the results of a plurality of auditing questions. The use of color, fonts, sounds or other manner of attracting a user's attention to questions reaching a threshold may be utilized. The exemplary displays of FIGS. 10, 11, 9 and 5 are therefore intended as exemplary screens for presenting such information.

While the foregoing is susceptible to various modifications and alternative forms, a specific embodiment thereof has been shown by way of example in the drawings and will herein be described in detail. Those skilled in the art will appreciate that the features described below can be combined in various ways to form multiple variations hereof. As a result, the foregoing is not limited to the specific examples described below, but only by the claims and their equivalents.

What is claimed is:

1. A method of automated auditing an insurance agreement using a computer coupled to a database, said method comprising:
    providing the insurance agreement for determining whether the insurance agreement is in compliance with a standard;
    prompting an input of a first selection criteria including at least one attribute describing the insurance agreement, the first selection criteria identifying a type of insurance agreement to be audited including at least one of life insurance, health insurance, personal property insurance, business casualty insurance, key-man insurance, and board of director's liability insurance;
    receiving, at the computer, the first selection criteria inputted by a user;
    automatically retrieving a second selection criteria by the computer from the database, the second selection criteria including other attributes describing the insurance agreement, the second selection criteria based on the first selection criteria, the second selection criteria including at least a face value of the insurance agreement;
    automatically selecting by the computer a subset of questions from a plurality of questions stored within the database in accordance with the first and second selection criteria, the subset of questions associated with at least one of the attributes received by the computer describing the insurance agreement, at least one question of the subset of questions is assigned a question weight;
    organizing the subset of questions into a plurality of pre-assigned categories, wherein each question included within the plurality of questions is pre-assigned to a category based on subject matter of the associated question, the plurality of pre-assigned categories including at least one of coverage, compliance, pricing, risk selection, underwriting, and line of business, and at least one of the plurality of pre-assigned categories is assigned a category weight;
    presenting the subset of questions to the user;
    receiving answers to the subset of questions from the user;
    scoring, on the computer, the answers to generate an answer score for each of the answers received from the user and modifying the answer score in accordance with the category weight;
    generating a categorical score for each category associated with the subset of questions based on a plurality of answer scores;
    generating an overall score associated with the subset of questions based on a plurality of answer scores;
    comparing the generated categorical scores to corresponding categorical threshold scores to determine whether the insurance agreement is in compliance with the standard; and
    comparing the overall score to a corresponding threshold score to determine whether the insurance agreement is in compliance with the standard,
    wherein at least one question of the subset of questions is assigned a zero-weight value such that the answer to a zero-weight value question is not scored,
    wherein each question is associated with at least two answer options, and
    wherein an answer weight for each question varies between the at least two answer options.

2. The method of claim 1, wherein receiving a first selection criteria further comprises:
    receiving the first selection criteria inputted by the user including audit type indicia indicating at least one of an audit type and an audit purpose.

3. The method of claim 1, wherein receiving a first selection criteria further comprises:
    receiving the first selection criteria inputted by the user including policy type indicia indicating policy limits of the insurance agreement.

4. The method of claim 1, wherein scoring further comprises:
    deriving an audit score as a function of one or more answer scores.

5. The method of claim 1, wherein scoring further comprises:
    modifying the answer score in accordance with the question weight.

6. The method of claim 1, wherein scoring further comprises:
    assigning an answer weight to the answer received for at least one question of the subset of questions; and
    modifying the answer score in accordance with the answer weight.

7. The method of claim 1, further comprising:
    comparing the answer score of at least one question of the subset of questions to an associated threshold value;
    indicating the result of the comparison; and
    providing the user a score improvement recommendation including identifying at least one question based on the comparison of the answer score to the associated threshold value and providing a guideline to improve at least one of the categorical score and the overall score.

8. The method of claim 7, wherein indicating the result further comprises:
indicating the result of the comparison as a graphical icon.

9. The method of claim 8, wherein indicating the result as a graphical icon further comprises:
indicating the result of the comparison as a traffic signal icon.

10. The method of claim 1, further comprising:
calculating an aggregate category score as a function of one or more answer scores of the subset of questions within one or more of the categories.

11. A method for automated auditing of an insurance agreement, said method comprising:
storing within a database an audit template having a plurality of questions and answer options associated with each question;
providing the insurance agreement for determining whether the insurance agreement is in compliance with a standard;
prompting an input of a first selection criteria including at least one attribute describing the insurance agreement, the first selection criteria identifying a type of insurance agreement to be audited including at least one of life insurance, health insurance, personal property insurance, business casualty insurance, key-man insurance, and board of director's liability insurance;
receiving, via a computer, the first selection criteria;
automatically retrieving, via the computer, a second selection criteria including other attributes describing the insurance agreement, the second selection criteria based on the first selection criteria, the second selection criteria including at least a face value of the insurance agreement;
automatically retrieving, via the computer, relevant questions from the audit template in accordance with the first and second selection criteria, the relevant questions associated with at least one of the attributes describing the insurance agreement, wherein each question is assigned a weight;
grouping the questions into categories selected from a group of categories consisting of: coverage, compliance, pricing, risk selection and underwriting;
organizing the retrieved questions into a plurality of pre-assigned categories, wherein each question included within the audit template is pre-assigned to a category based on subject matter of the associated question, the plurality of pre-assigned categories including at least one of coverage, compliance, pricing, risk selection, underwriting, and line of business, and at least one of the plurality of pre-assigned categories is assigned a category weight;
presenting the retrieved questions and associated answer options to a user;
receiving answers from the user;
generating categorical scores based on the received answers and the pre-assigned categories and comparing the categorical scores to corresponding categorical threshold scores to determine whether the insurance agreement is in compliance with the standard; and
generating, via the computer, an audit score as a function of the received answers and the category weight, wherein the audit score represents a measure of compliance of the insurance agreement with the standard including whether the insurance agreement is in compliance within each category of the retrieved questions, wherein at least one question of the retrieved questions is assigned a zero-weight value such that the answer to a zero-weight value question is not scored,
wherein each question is associated with at least two answer options, and
wherein an answer weight for each question varies between the at least two answer options.

12. The method of claim 11 wherein generating the audit score further comprises:
generating the audit score as a function of the received answers and the question weight.

13. The method of claim 12 wherein each answer option associated with each question is assigned an answer weight.

14. The method of claim 11 wherein generating the audit score further comprises:
generating the audit score for each category as a function of the received answers and the category weight for questions grouped in each category.

15. The method of claim 11 further comprising
summarizing the received answers to the questions in each category of said plurality of pre-assigned categories; and
presenting the summarized information regarding the received answers.

16. The method of claim 11 further comprising:
comparing the audit score to an associated threshold value; and
providing information regarding techniques to improve the audit score in response to the comparison.

17. A non-transitory computer readable storage medium having computer readable program codes embodied in the computer readable storage medium for automated auditing of an insurance agreement, the computer readable program codes, when executed, cause a computer to perform:
providing the insurance agreement for determining whether the insurance agreement is in compliance with a standard;
prompting an input of a first selection criteria including at least one attribute describing the insurance agreement, the first selection criteria identifying a type of insurance agreement to be audited including at least one of life insurance, health insurance, personal property insurance, business casualty insurance, key-man insurance, and board of director's liability insurance;
receiving the first selection criteria;
automatically retrieving a second selection criteria including other attributes describing the insurance agreement, the second selection criteria based on the first selection criteria, the second selection criteria including at least a face value of the insurance agreement;
automatically selecting a subset of questions from a plurality of questions in accordance with the first and second selection criteria, the subset of questions associated with at least one of the attributes describing the insurance agreement, at least one question of the subset of questions is assigned a question weight;
organizing the subset of questions into a plurality of pre-assigned categories,
wherein each question included within the plurality of questions is pre-assigned to a category based on subject matter of the associated question, the plurality of pre-assigned categories including at least one of coverage, compliance, pricing, risk selection, underwriting, and line of business, and at least one of the plurality of pre-assigned categories is assigned a category weight;
presenting the subset to a user;
receiving answers to the subset from said user;

scoring the answers to generate an answer score for each of the answers received from the user and modifying the answer score in accordance with the category weight;

generating a categorical score for each category associated with the subset of questions, wherein the categorical score is a function of one or more answer scores;

generating an overall score associated with the subset of questions, the overall score being a function of one or more answer scores;

comparing the generated categorical scores to corresponding categorical threshold scores to determine whether the insurance agreement is in compliance with the standard; and comparing the overall score to a corresponding threshold score to determine whether the insurance agreement is in compliance with the standard, wherein at least one question of the subset of questions is assigned a zero-weight value such that the answer to a zero-weight value question is not scored, wherein each question is associated with at least two answer options, and wherein an answer weight for each question varies between the at least two answer options.

18. The non-transitory computer readable storage medium of claim 17, wherein receiving a first selection criteria further comprises:

receiving the first selection criteria including audit type indicia indicating at least one of an audit type and an audit purpose.

19. The non-transitory computer readable storage medium of claim 17, wherein receiving a first selection criteria further comprises:

receiving the first selection criteria including policy type indicia indicating policy limits of the insurance agreement.

20. The non-transitory computer readable storage medium of claim 17, wherein scoring further comprises:

deriving an audit score as a function of one or more answer scores.

21. The non-transitory computer readable storage medium of claim 17, wherein scoring further comprises:

modifying the answer score in accordance with the question weight.

22. The non-transitory computer readable storage medium of claim 17, wherein scoring further comprises:

assigning an answer weight to the answer received for at least one question of the subset of questions; and modifying the answer score in accordance with the answer weight.

23. The non-transitory computer readable storage medium of claim 17, wherein the method further comprises:

comparing the answer score of at least one question of the subset of questions to an associated threshold value;

indicating the result of the comparison; and providing the user a score improvement recommendation including identifying at least one question based on the comparison of the answer score to the associated threshold value and providing a guideline to improve at least one of the categorical score and the overall score.

24. The non-transitory computer readable storage medium of claim 23, wherein indicating the result further comprises:

indicating the result of the comparison as a graphical icon.

25. The non-transitory computer readable storage medium of claim 24, wherein indicating the result as a graphical icon further comprises:

indicating the result of the comparison as a traffic signal icon.

26. The non-transitory computer readable storage medium of claim 17, wherein the method further comprises:

calculating an aggregate category score as a function of one or more answer scores of the subset of questions within one or more of the categories.

27. A system for automated auditing of an insurance agreement, the system comprising:

means for prompting an input of a first selection criteria including at least one attribute describing the insurance agreement, the first selection criteria identifying a type of insurance agreement to be audited including at least one of life insurance, health insurance, personal property insurance, business casualty insurance, key-man insurance, and board of director's liability insurance;

means for receiving the first selection criteria;

means for retrieving a second selection criteria including other attributes describing the insurance agreement, the second selection criteria based on the first selection criteria, the second selection criteria including at least a face value of the insurance agreement;

means for selecting an audit template according to attributes of the insurance agreement;

means for selecting questions from the selected audit template in accordance with the first and second selection criteria, the questions associated with at least one of the attributes describing the insurance agreement, at least one question included within the audit template is assigned a question weight;

means for organizing the selected questions into a plurality of pre-assigned categories, wherein each question included within the audit template is pre-assigned to a category based on subject matter of the associated question, the plurality of pre-assigned categories including at least one of coverage, compliance, pricing, risk selection, underwriting, and line of business, and at least one of the plurality of pre-assigned categories included within the audit template is assigned a category weight;

means for presenting the selected questions with associated answer options to a user;

means for receiving answers to the questions from the user;

means for scoring said answers to generate a categorical score for each category associated with the selected questions and an overall score associated with the selected questions;

means for modifying the categorical score and the overall score in accordance with the category weight;

means for comparing the generated categorical scores to corresponding categorical threshold scores to determine whether the insurance agreement is in compliance with the standard; and means for comparing the overall score to a corresponding threshold score to determine whether the insurance agreement is in compliance with the standard, wherein at least one question of the selected questions is assigned a zero-weight value such that the answer to a zero-weight value question is not scored, wherein each question is associated with at least two answer options, and wherein an answer weight for each question varies between the at least two answer options.

28. A network-based system for auditing an insurance agreement, said system comprising:

a client system;

a database for storing information including the insurance agreement being audited for compliance with a standard; and a server system configured to be coupled to said client system and said database, said server system configured to:

prompt an input of a first selection criteria including at least one attribute describing the insurance agreement, the first selection criteria identifying a type of insurance agreement to be audited including at least one of life insurance, health insurance, personal property insurance, business casualty insurance, key-man insurance, and board of director's liability insurance;

receive the first selection criteria;

automatically retrieving a second selection criteria including other attributes describing the insurance agreement, the second selection criteria based on the first selection criteria, the second selection criteria including at least a face value of the insurance agreement;

automatically select a subset of questions from a plurality of questions in accordance with the first and second selection criteria, the subset of questions associated with at least one of the attributes describing the insurance agreement, the plurality of questions stored within the database, at least one question of the subset of questions is assigned a question weight;

organize the subset of questions into a plurality of pre-assigned categories, wherein each question included within the plurality of questions is pre-assigned to a category based on subject matter of the associated question, the plurality of pre-assigned categories including at least one of coverage, compliance, pricing, risk selection, underwriting, and line of business, and at least one of the plurality of pre-assigned categories of the subset of questions is assigned a category weight;

present the subset to a user;

receive answers to the subset from said user;

score said answers to generate a categorical score for each category associated with the subset of questions and an overall score associated with the subset of questions;

modify the categorical score and the overall score in accordance with the category weight;

compare the generated categorical scores to corresponding categorical threshold scores to determine whether the insurance agreement is in compliance with the standard; and compare the overall score to a corresponding threshold score to determine whether the insurance agreement is in compliance with the standard, wherein at least one question of the subset of questions is assigned a zero-weight value such that the answer to a zero-weight value question is not scored, wherein each question is associated with at least two answer options, and wherein an answer weight for each question varies between the at least two answer options.

29. The method of claim 1, wherein automatically selecting a subset of questions further includes automatically selecting a subset of questions in accordance with the face value of the insurance agreement.

30. The method of claim 1, wherein comparing each generated categorical score and the overall score further includes comparing each generated categorical score with at least one of the other generated categorical scores and the overall score to identify a category of the plurality of pre-assigned categories requiring improvement within a contracting entity.

* * * * *